April 26, 1949. V. B. M. MALLENTJER 2,468,453
REVERSIBLE DRIVE MECHANISM
Filed March 20, 1939 2 Sheets-Sheet 1
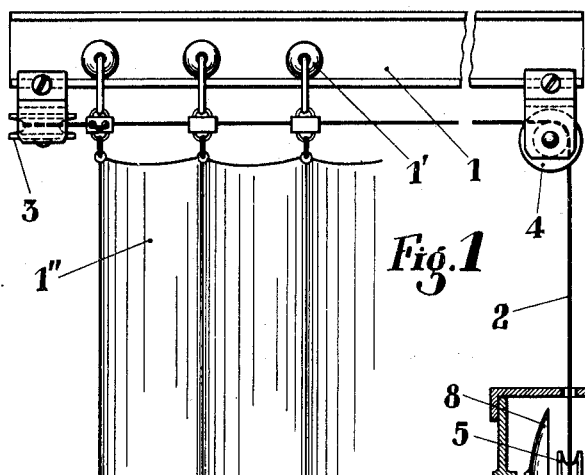
Fig. 1
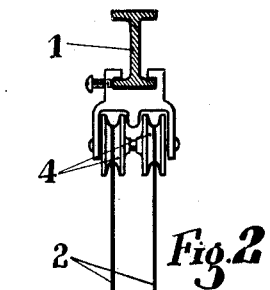
Fig. 2
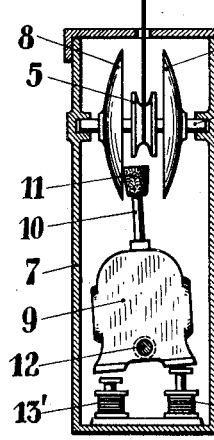
Fig. 3
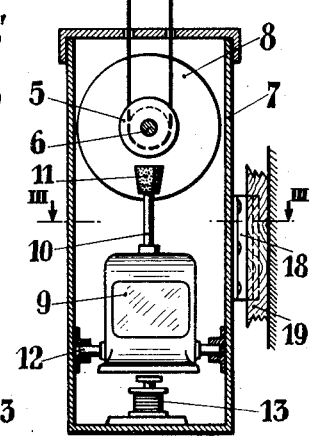
Fig. 4 (Fig.5 label visible)
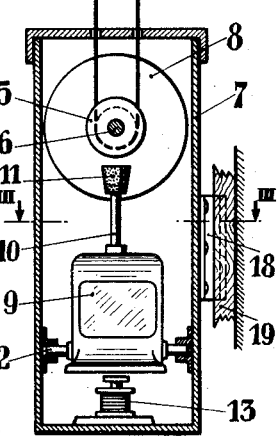
Fig. 6
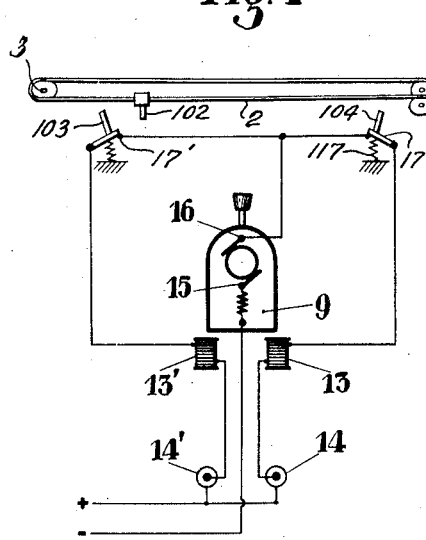
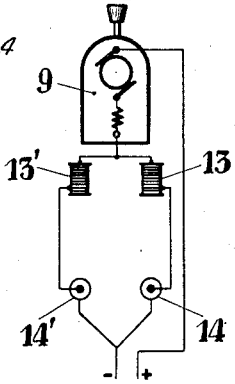
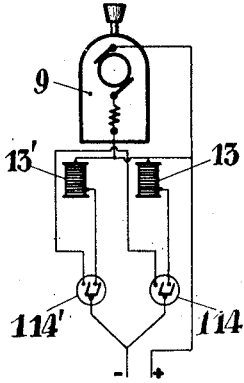
Inventor:
Victor, Bernard, Marie, Mallentjer
Attorney

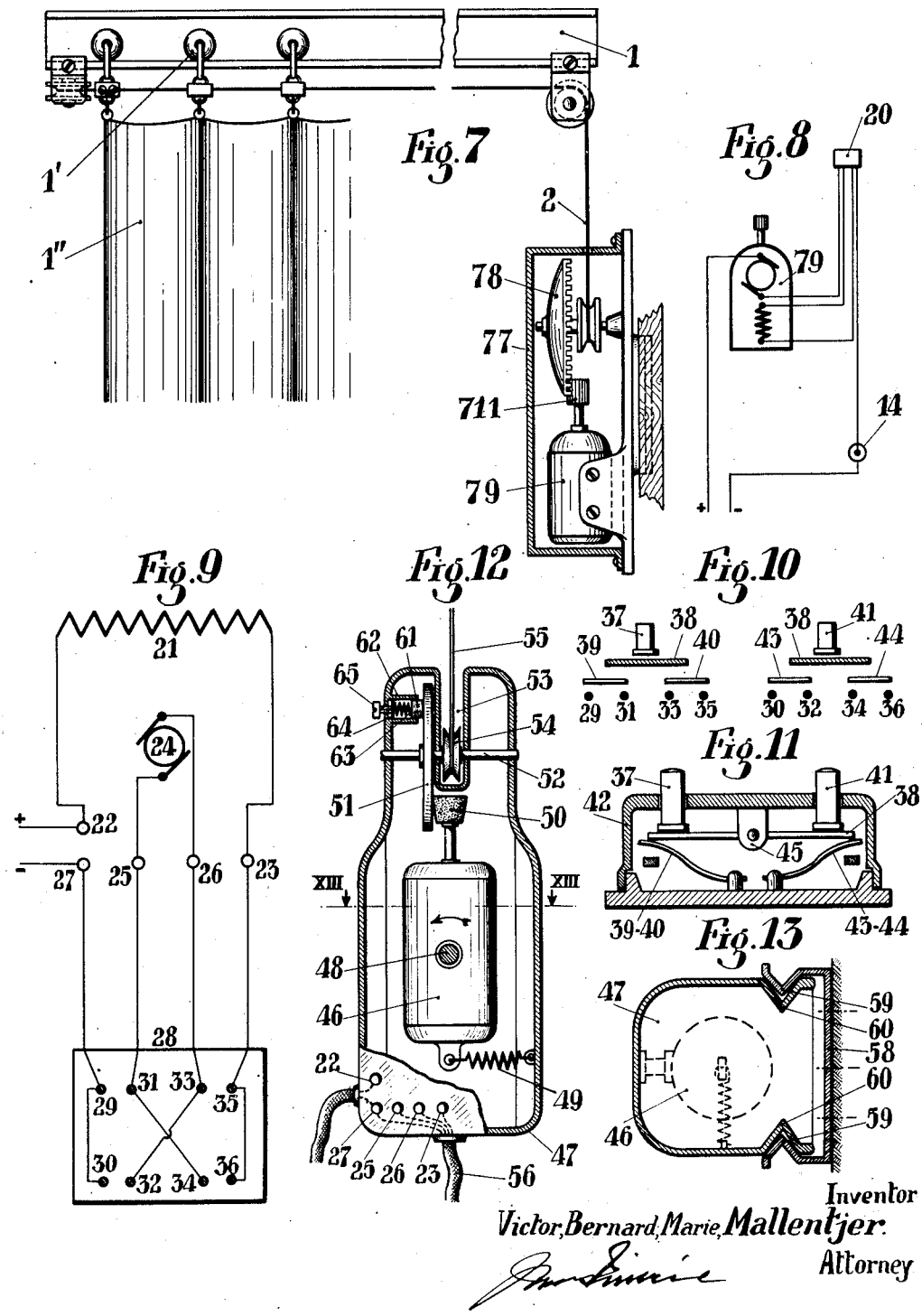

Patented Apr. 26, 1949

2,468,453

UNITED STATES PATENT OFFICE 2,468,453

REVERSIBLE DRIVE MECHANISM

Victor Bernard Marie Mallentjer,
Brussels, Belgium

Application March 20, 1939, Serial No. 262,962
In Belgium April 12, 1938

Section 1, Public Law 690, August 8, 1946
Patent expires April 12, 1958

7 Claims. (Cl. 318—10)

1

The present invention has reference to an electrical mechanism adapted to actuate in two directions and between certain adjustable limits the movement of a flexible traction member (cord, chain, cable), with preferably automatic reversal of the direction of movement of this traction member when this has reached the end of its course, the essential feature of this mechanism being that the electric driving motor, and the transmission, are mounted on a vertically guided support suspended with the whole of its weight, from the traction member so as to maintain this member taut.

The electric motor may be combined with a current-reversing device in such a manner that the actuated traction member, or any member participating in its movement causes this reversing device to function when reaching the end of its course, in each direction so as to reverse the movement of the motor. It is also possible to make the arrangements such that the motor always turns in the same direction. In this case the connection between the motor and the driving shaft for the traction member is necessarily provided with a mechanism for reversing the transmission which preferably acts by an electrical or mechanical control on the motor itself which, mounted on a transverse shaft, brings its driving pinion or cone into engagement with one or other of discs keyed on opposite sides of this pinion or cone on the said driving shaft of the traction member. This electrical drive for pivoting the motor is provided for example with two electro magnets arranged in series or in shunt with the motor circuit.

A few diagrammatic examples of construction of the invention as applied to window curtains are illustrated in the accompanying drawings.

Fig. 1 is a front view of the assembly with a vertical section of the driving mechanism.

Fig. 2 is a vertical section through the pivotal axis of the electrical motor in Fig. 1.

Fig. 3 is a horizontal section along the line III—III of Fig. 2.

Fig. 4 is a diagram of the electrical connections for the assembly of Fig. 1.

Fig. 5 is a diagram of the electric circuit of a modification of the diagram of Fig. 4.

Fig. 6 is a diagram of the electric circuit of another modification of the diagram of Fig. 4.

Fig. 7 is a view of the assembly of a modification with a non-pivoting motor, whilst Fig. 8 shows a diagram of the electric circuit for the modification of Fig. 7.

Fig. 9 shows a schematic view of the electric

2 connections of the motor and of the switch, of still another embodiment.

Fig. 10 a detail of a realisation of the double switch with push-buttons for the switches of the circuit of Fig. 9.

Fig. 11 shows another detail of the push-buttons in Fig. 10.

Fig. 12 shows a schematic view of the motor, of its container and of the transmissions for the modification of Fig. 9.

Fig. 13 shows a section along the line XIII—XIII of Fig. 12.

In Figs. 1 to 4, 1 indicates the metal rail on which roll rollers 1' from which a curtain 1'' is suspended in the known manner. (It is to be observed that the type of suspension referred to as "curtain rail" is not limiting and that the curtain may be suspended simply from rings threaded on a rigid rod). The single traction cord by which the curtain may be opened or closed, is indicated by 2. It is an endless cord attached in the usual manner to two attaching members secured to the ends to be connected to the two half curtains, the two other ends of these half curtains being secured for example to the rail 1. The cord 2 passes around a horizontal pulley 3, its two ends then passing around two vertical pulleys 4 so as finally to pass around the vertical pulley 5, turned through 90° relatively to the pulleys 4.

The pulley 5 is keyed to the middle of a shaft 6 rotatably mounted in a box 7. To this shaft are keyed on opposite sides of the pulley 5, two identical friction plates 8, 8'. In the box 7 there is mounted an electric motor 9 of which the vertical shaft 10 carries at the end a small friction cone 11, for example of special rubber. The motor is supported in unstable equilibrium by two trunnions 12 in such a manner as to be capable of oscillating about the axis of these trunnions and thus apply its cone 11, the face of one or other plate 8, 8'. The motor may carry at the bottom, the movable parts of two electro magnets 13, 13' located in the box 7, and mounted symmetrically on opposite sides of the trunnions.

Referring to Fig. 4, switches 14 and 14' are placed on the side of the box 7 and adapted to be operated separately for opening and closing the curtains. Each of these switches controls the circuit of the motor and thus causes this motor to turn always in the same direction. 15 is the "—" terminal of the motor and 16 the "+" terminal. The current passing through the closed switch 14 first passes through the coil 13 which causes the motor to rock into the position of Fig.

1 so as to bring the cone 11 into contact with the plate 8. This current passes through the switch 17, normally closed by tension spring 117, and reaches the terminal 16. The motor rotates and advances the cord 2. When the curtain has reached the end of its corresponding course any suitable member 102 (Fig. 4) secured to the curtain or to the cord 2, engages lever 104 and opens the switch 17 against the action of spring 117 and holds it open as long as the curtain has not carried out a movement in the opposite direction. The circuit is thus open and the motor stops. Any fresh actuation of the switch 14 remains ineffective. When the switch 14' is closed the current passes through the coil 13" and the normally closed switch 17' so as to reach 16. The motor rocks and brings its cone 11 into contact with the plate 8'. The motor, whilst rotating, produces the advance of the cord 2 in a direction opposite to that of the preceding movement until the switch 17' is opened by the curtain reaching the end of its movement and member 102 contacting lever 103 on switch 17'. When the curtain has left one or other position of complete closing or opening, the two switches 17 and 17' are automatically closed, which permits actuation of either of the two switches 14, 14'. It is only in the positions of complete closing and opening that one or other of the switches 14, 14' is inoperative. The mechanism thus permits a partial opening of the curtain or hanging.

In this example of a curtain for a bay, the box 7 and all the mechanism which it encloses is in fact suspended from the cord 2 so as to ensure effective tension therein at every moment. The box is provided with a rail 18 guided in a slide 19 to be fixed to the wall.

In the example of Fig. 5, which refers to the mechanism of Figs. 1–3, the two operating buttons (switches) 14, 14' are mounted in two circuits in series, each of which is provided with electro magnets 13, 13', the switches 17, 17' being omitted. In this case it is necessary for the entrainment between the cone 11 and the discs 8, 8' to be very soft so that the cone 11, slides on these discs when the curtain has reached the end of its stroke and the switch 14 or 14' has not been released.

In the modification of Fig. 6 there is shown a circuit mounting two bi-polar switches 114, 114' in parallel.

In the example of Figs. 7 and 8 the motor 79 is no longer pivoted in its box 77. The electro magnets are omitted and there is only one disc 78 which may be toothed, the cone 11 being then a small pinion 711. The motor actuated by a single switch 14, is provided in the circuit with a reversing device 20 (Fig. 8) which is controlled by the position of the curtain and reverses the direction of the current of its motor so as to reverse the direction of rotation.

The construction shown in Figs. 9 to 13 allows whatever the position of the curtain may be, or more exactly of the cable, or other traction member, to cause this traction device to move in either direction at will, then, after a short run, to modify the direction of the movement, and so on, without having to run to the end of the course.

In Fig. 9, the stator of the motor is indicated by 21 and its terminals by 22—23; the rotor is indicated by 24 and its terminals by 25—26. 27 is the entering terminal of the network, the other terminal being 22. The key switch, schematised by the rectangle 28, has eight terminals: the terminal 29 connected with 27 and 30; the terminal 31 connected with 34 and with 25; the terminal 33 connected with 32 and with 26, and the terminal 35 connected on the one hand with 23, and on the other hand with 36. The four odd terminals are set in motion together in a closed position and are connected together two by two: 29 to 31 and 33 to 35; the four even terminals are set in motion and connected in like manner in the other closed position of the switch. Fig. 10 well shows how the connections take place: when the push-button 37 is lowered, the insulating disc 38 lowers the two conducting strips 39 and 40 on the terminals 29, 31 and 33, 35 respectively; in this position, the circuit of the motor is established by 27—29—31—25—rotor—26—33—35—23—stator—22.

In the other closed position of the key switch, the second push-button 41 brings, by means of the insulating disc 38, the conducting strips 43—44 on to the terminals 30—32 and 34—35 respectively, setting up the circuit: 27—29—30—32—33—26—rotor—25—31—34—36—35—23—stator and 22.

So long as one or other of the push-buttons is lowered, the motor revolves in the direction corresponding to the signs of the poles of the rotor. To prevent having to keep the button down during the entire time of the movement, for instance, when one wishes to bring the traction device to the end of the course, one can evidently use a tumbler switch, or a drum switch, the movable devices of which remain in the position given them; in this case, one must however provide a current breaker controlled by the traction device arriving at the end of its course, this breaker only influences the circuit interested, and allows the closing of the other circuit when the circuit breaker's position is changed.

In the simplified realization shown, of a circuit breaker with two push-buttons, the cover 42 of the circuit breaker carries interiorly the pivot 45 of the insulating blade 38 which is thus mounted like the beam of a balance. The two push-buttons 37 and 41 rest freely on this plate. The conducting blades 39—40—43—44 act as a spring and lean elastically, by means of their free upper extremities, against the inferior face of the plate 32 (Fig. 11). Under such conditions, the simultaneous lowering of the two buttons is impossible, and when one button has been lowered and is freed, the conducting blades which are stretched cause the whole to return to the position shown.

The motor 46 is mounted in a box or container 47; it is fixed there pivoting around trunnions 48, and a spring 49 tends to cause it to pivot in the direction of the arrow, Fig. 12. The shaft of the motor carries the little friction cone 50, which is elastically applied by the spring 49, against the disc 51 situated in the box and the shaft of which 52 passes through a vertical opening 53 of the box. In this opening, the shaft carries the grooved pulley 54 around which the traction device 55 imbeds itself.

The spring, besides assuring an elastic application of the cone 50 on 51, allows a slipping when the traction device is at the end of the course, and allows an automatic recovery of the wear of the friction surface of the disc 50.

The box carries the terminals 22—27—25—26—23, the conductors running to the key switch being enclosed in the sheath 56.

The box is vertically guided in a groove 58 (Fig.

13) fitted with two flanges 59 which fit in notches 60 in the side walls of the box.

The invention also provides a brake controllable by the disc 51, so as to reduce the displacement speed of the traction device at will; in the example given, this braking is carried out but means of a buffer, or of a brake-shoe 61, situated partly in the tube 62, fixed in a gear-case 47. A spring 63 is fitted in this tube 62 which bears on the buffer 61 and on a washer 64; a screw 65 the head of which bulges out of the gear-case 47, is screwed more or less into the end of the tube 62 and thus allows the spring to be controlled as far as its tension is concerned, and further the intensity of the brake-power exerted by the shoe 61 on the surface of the disc 51.

Evidently, the circuit-breaker need only carry four switch contacts, the push-button or buttons, or any other control device which would, in one position, set in motion two contact blades which connect the first switch contact with the second, and the third with the fourth, whereas in the other position, the blades would connect the first to the third and the second to the fourth switch contacts.

Any other combination of the electric circuit acting so as to either change the position of the motor (Figs. 1–3) or for reversing the direction of the current (Fig. 8) may evidently be applied. It is also possible in the case of a pivoting motor to provide a mechanical control which, influenced by the position of the curtain determines the pivoting of the motor.

This mechanism may be applied advantageously for opening and closing suspended curtains and hangings operated up to the present by a traction cord to rigid shutters and doors, retractiles or others and in all cases where a body or surface which is rigid or not is to be moved in one direction or the other.

The friction cone only acting on the plates by an edge has the advantage of being capable of being adjusted along its shaft so as to modify the speed of the cord and to ensure a smooth operation without shocks.

Having now fully described my said invention, what I claim and desire to secure by Letters Patent, is:

1. A curtain opening and closing mechanism comprising a split curtain and an endless cord having a horizontal loop and a vertical loop, means to attach adjacent split ends of said curtains to opposite traces of said horizontal loop, a driving pulley suspended in said vertical loop and mounted on a horizontal shaft, a frame suspended on said shaft, an electric motor mounted in said frame, means in said frame to connect said motor to drive said shaft, and means to reverse the drive of said shaft to open and close said curtain.

2. An overhead track, rollers on the track having suspension means therefrom, a pair of guide pulleys fixed with the track, an additional guide pulley fixed with the track and spaced from the pair of guide pulleys, an endless cable having a first loop from the pair of pulleys with horizontal reaches therefrom in the cable loop extent about the additional pulley, actuating connections between one of said cable reaches of the loop and the suspension means to be thereby shiftable along the track, said cable from the pair of pulleys having a depending second loop, a vertical axis motor sustained by the second loop, transmission means from the motor to the cable second loop, and control means to reverse the direction of the transmission from the transmission means for the cable.

3. An endless cable including two loops, a pair of pulleys spacing the loops, a pulley in each loop remote from the pair of pulleys, one of said loops having a reach with an actuated element connected thereto, a vertical axis motor sustained through the pulley in the other of said loops, transmission means from the motor to the cable at the motor sustaining pulley, and control means to reverse the direction of transmission from the transmission means for the cable.

4. The structure of claim 3 wherein said transmission means comprises a rolling friction contacting means.

5. The structure of claim 4 wherein said contacting means comprises a pair of parallel friction engaging discs and a tiltable friction roller mounted between said discs, and wherein said control means comprises a pair of electromagnets to tilt said roller.

6. The structure of claim 3 wherein said transmission means comprises a pair of intermeshing gears.

7. The structure of claim 3 wherein said control means comprises a reversing switch and a reversible motor.

VICTOR BERNARD MARIE MALLENTJER.

REFERENCES CITED

The following references are of record in the file of this patent:

UNITED STATES PATENTS

| Number | Name | Date |
| --- | --- | --- |
| 912,732 | Roberts | Feb. 16, 1909 |
| 1,247,732 | Shelton | Nov. 27, 1917 |
| 1,425,890 | Merrill | Aug. 15, 1922 |
| 1,499,735 | Hynes | July 1, 1924 |
| 1,846,687 | Mentor | Feb. 23, 1932 |
| 1,909,611 | Charavay | May 16, 1933 |
| 2,102,672 | Brixey | Dec. 21, 1937 |
| 2,165,754 | Hornack | July 11, 1939 |

FOREIGN PATENTS

| Number | Country | Date |
| --- | --- | --- |
| 301,140 | Great Britain | Nov. 29, 1928 |